United States Patent Office 3,446,077
Patented May 27, 1969

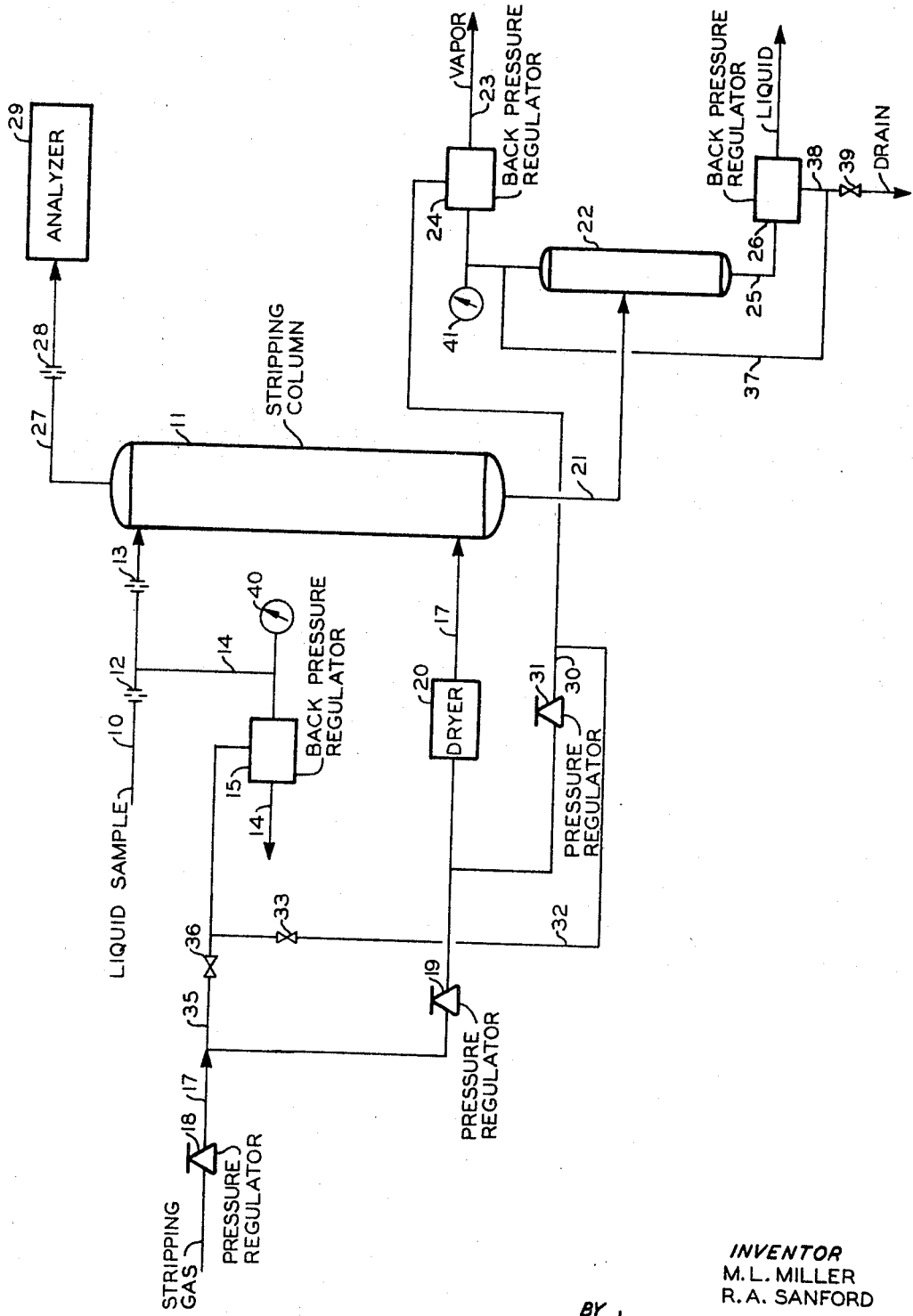

3,446,077
SAMPLING SYSTEM
Richard A. Sanford and Maurice L. Miller, Bartlesville, Okla., assignors to Phillips Petroleum Company, a corporation of Delaware
Filed Aug. 15, 1966, Ser. No. 572,283
Int. Cl. G01n 1/22
U.S. Cl. 73—421.5
6 Claims

ABSTRACT OF THE DISCLOSURE

A sampling system to provide vapor samples from liquid streams. The liquid sample is introduced into the top portion of a stripping column and inert gas is introduced into the base of the column. Vapor rich sample gas is extracted from the top of the column for subsequent analysis and stripped liquid is extracted from the base. A separator is connected to the liquid discharge line to remove any entrained gas therefrom. Pressure controls are provided to maintain proper flow conditions.

---

Various types of analytical instruments require vapor samples at fairly low temperatures, thus eliminating total vaporization as a sampling method except for those samples that have a high vapor pressure at ambient conditions. In some analysis procedures, it is desirable to measure only certain constituents of a liquid stream. Vapor samples can be prepared for these situations by stripping the material to be detected from the liquid stream in a gas-liquid contacting zone. In sample preparation systems of this type which have been employed heretofore, certain difficulties have been encountered. In the analysis for water, for example, it has been difficult to design a dependable sampling system that does not have excessive holdup for water. It has also been difficult to design a column drainage system which dumps properly without permitting water vapor to back up the drain to interfere with the analysis of the vapor phase from the stripper.

This invention is directed to an improved sampling system wherein a constituent to be analyzed is removed from a liquid sample by contacting the sample with a stripping gas. The liquid sample is introduced into the upper region of the stripping column, and stripping gas is introduced into the lower region to flow countercurrent to the descending liquid. A pressure regulating system controls the pressure of the stripping gas, the flow of liquid sample, and the removal of liquid from the stripping zone. It is important in systems of this type to prevent water vapor from backing up the liquid drain into the column. A continuous drain system is provided in accordance with one embodiment of this invention to eliminate this problem.

Accordingly, it is an object of this invention to provide an improved system for preparing vapor samples from liquid streams. Another object is to provide an improved system for measuring selected constituents of a liquid sample. A further object is to provide a continuous drain system for a stripping column to keep liquid holdup in the column at a minimum.

Other objects, advantages and features of the invention will become apparent from the following detailed description, taken in conjunction with the accompanying drawing which is a schematic representation of a preferred embodiment of the invention.

Referring now to the drawing in detail, a liquid sample to be analyzed is introduced through a conduit 10 which communicates with the upper region of a stripping column 11. Flow restricting elements 12 and 13 are disposed in conduit 10. These elements can be needle valves or other type of flow restrictors, such as capillary tubes. A by-pass conduit 14, which has a back-pressure regulator 15 therein, communicates with conduit 10 between restrictors 12 and 13. A stripping gas is introduced into the system through a conduit 17 which communicates with the lower region of stripping column 11. Pressure regulators 18 and 19 and a dryer 20 are disposed in conduit 17.

The liquid sample from conduit 10 flows downwardly through column 11 and is removed through a conduit 21 which communicates with a vertical column or conduit 22 which provides a phase separation zone. Vapor is removed from the top of column 22 through a conduit 23 which has a back-pressure regulator 24 therein. Liquid is removed from the bottom of conduit 22 through a conduit 25 which has a back pressure regulator 26 therein. The stripping gas flows upwardly through column 11 and is removed from the top through a conduit 27 which has a flow restrictor 28 therein. Conduit 27 can introduce the stripping gas, which contains a component or components of the liquid sample, to an analyzer 29.

A conduit 30, which has a pressure regulator 31 therein, communicates between conduit 17, downstream of pressure regulator 19, and the set point inlet of back-pressure regulator 24. A conduit 32, which has a valve 33 therein, communicates between conduit 30, downstream of pressure regulator 31, and the set point inlet of back-pressure regulator 15. A conduit 35, which has a valve 36 therein, communicates between conduit 17, downstream of pressure regulator 18, and the set point inlet of back-pressure regulator 15. A conduit 37 is connected between conduit 23, upstream of back-pressure regulator 24, and the set point inlet of back-pressure regulator 26. A drain conduit 38, which has a normally closed valve 39 therein, communicates with conduit 37 in order that condensate may be drained from conduit 37 as needed. A pressure gauge 40 is connected to conduit 14, and a pressure gauge 41 is connected to conduit 23.

The rate of flow of liquid sample into stripping column 11 is controlled by flow restrictors 12 and 13 and the setting of back-pressure regulator 15. The setting of back-pressure regulator 15 is controlled by the pressure which is established by pressure regulator 31 and/or the setting of pressure regulator 18, depending on the openings of valves 33 and 36. The setting of pressure regulator 31 also controls the settings of back-pressure regulators 24 and 26, which control the pressure at which withdrawal of fluid from stripping column 11 occurs. Flow restrictor 28 serves to regulate the rate of flow of sample to analyzer 29.

In operation, pressure regulator 31 is set at a pressure such that back-pressure regulator 24 controls the stripping column pressure at a desired value. Pressure regulator 19 is set at the same or higher pressure than pressure regulator 31 in order to provide the required pressure to permit the required gas flow to analyzer 29 and a small excess gas flow through vent conduit 23. This small excess permits back-pressure regulator 24 to maintain the column pressure and flow by providing a positive driving force to remove liquid from the stripping column. This assists in preventing back flow of vapor from the vent to the stripping column. The back flow of vapor is further prevented by the use of a relatively small conduit 21. Liquid droplets substantially fill such a column and assist in blocking vapor flow. If pressure regulator 19 is set at the same pressure as regulator 31, the latter can be eliminated. However, this depends to a large degree on the pressure drop through the dryer. The settings of restrictors 12 and 13 and pressure regulator 18 are such as to provide a sufficiently large pressure difference across restrictor 13 to maintain this difference constant despite minor fluctuations of the output pressure from regulators 18 and 31. Valves 33 and 36 provide a convenient method of controlling liquid flow to the stripping column without the action of a valve in the sample line. If the system is adjusted such that the pressure at gauge 40 is equal to the pressure at gauge 41, there is no liquid flow to the column. Restrictor 28 is designed to provide the proper pressure drop needed to deliver the desired flow at the desired pressure to analyzer 29.

As a specific example of the operation of the sampling system of this invention, reference is made to the analysis of the water present in a liquid stream of cyclohexane. The cyclohexane, which forms the liquid sample, contains several parts per million water. Such a liquid stream is introduced into conduit 10 at a flow rate of 80 cubic centimeters per minute. Five cubic centimeters per minute of the sample flow through restrictor 13 to column 11, and 75 cubic centimeters per minute flow through conduit 14. The cyclohexane is introduced into the system at a pressure of 500 pounds per square inch absolute (p.s.i.a.), and is reduced to a pressure of 60 p.s.i.a. at the entrance to restrictor 13. Nitrogen at an inlet pressure of approximately 2,000 p.s.i.a. is introduced into the system through conduit 17. Pressure regulator 18 reduces this pressure to 60 p.s.i.a. Pressure regulator 19 reduces the pressure to the range of 53 to 54 p.s.i.a., and pressure regulator 31 further reduces the pressure to a value of approximately 50 p.s.i.a. Restrictor 28 reduces the pressure of the stripping gas, which contains water vapor stripped from the cyclohexane, to a pressure of 35 to 40 p.s.i.a. Analyzer 29 measures the water concentration in the stream passed through conduit 27.

The sampling system of this invention offers several advantages over conventional systems. It is not necessary that there be any valves, pressure regulators or flow controllers between the sample inlet and the analyzer. This serves to reduce the water holdup in the system and provides more accurate analyses. The system of this invention also permits the sample flow to be shut off without requiring a valve in the sample line. In addition, it is not necessary that there be any pressure or flow regulators between the dry stripping gas from dryer 20 and the analyzer. A positive flow of liquid drainage from the system is assured, and there is no possibility of water backup through the drain from the column. This particular drain system does not require priming as is necessary in many dumping systems.

While the invention has been described in conjunction with the analysis of trace quantities of water in liquid samples, it should be evident that the system is useful in other types of analyses. In some instances, dryer 20 is not needed. Alternatively, the dryer can be placed upstream in the stripping gas line.

While this invention has been described in conjunction with a presently preferred embodiment, it should be evident that it is not limited thereto.

What is claimed is:
1. A system for removing at least one constituent from a liquid, comprising a stripping column, first conduit means communicating with the upper region of said column to introduce a liquid, second conduit means communicating with the lower region of said column to introduce a stripping gas, third conduit means communicating with the top of said column to remove vapor containing said constituent, fourth conduit means communicating with the bottom of said column to remove fluid, first and second pressure regulators connected in series in said second conduit means, the pressure established at the outlet of said second pressure regulator being less than the pressure established at the outlet of said first pressure regulator, means responsive to the pressure at the outlet of said first pressure regulator to control the rate of flow of liquid into said column through said first conduit means, and means responsive to the pressure at the outlet of said second pressure regulator to adjust the rate of withdrawal of fluid from said column through said fourth conduit means.

2. The system of claim 1 wherein said fourth conduit means comprises vertical conduit means, fifth conduit means communicating between the bottom of said column and said vertical conduit means, sixth conduit means communicating with the top of said vertical conduit means to remove vapor, and seventh conduit means communicating with the bottom of said vertical conduit means to remove liquid, and wherein said means responsive to the pressure at the outlet of said second pressure regulator comprises means to adjust the flows through said sixth and seventh conduit means.

3. The system of claim 2 wherein said means to adjust the flows through said sixth and seventh conduit means comprises a first back-pressure regulator in said sixth conduit means, a second back-pressure regulator in said seventh conduit means, means responsive to the pressure at the outlet of said second pressure regulator to control said first back-pressure regulator, and means responsive to the pressure in said sixth conduit means upstream of said first back-pressure regulator to control said second back-pressure regulator.

4. The system of claim 1 wherein said means to control the rate of flow of liquid into said column comprises first and second flow restrictors connected in series in said first conduit means, fifth conduit means communicating with said first conduit means between said flow restrictors to vent liquid, a back-pressure regulator in said fifth conduit means, and means responsive to the pressure at the outlet of said first pressure regulator to control said back-pressure regulator.

5. The system of claim 1 wherein said means to adjust the rate of withdrawal of fluid from said column includes a third pressure regulator having the inlet thereof connected to said second conduit means downstream of said second pressure regulator, the outlet pressure of said third pressure regulator being less than the outlet pressure of said second pressure regulator, said means to adjust the rate of withdrawal of fluid from said column being responsive to the outlet pressure of said third pressure regulator.

6. The system of claim 5, further comprising first and second flow restrictors connected in series in said first conduit means, fifth conduit means communicating with said first conduit means between said flow restrictors to vent liquid, a back-pressure regulator in said fifth conduit means, first valved conduit means connected between the output pressure end of said first pressure regulator and said back-pressure regulator, and second valved conduit means connected between the output pressure end of said third pressure regulator and said back-pressure regulator.

References Cited

UNITED STATES PATENTS

| | | | |
|---|---|---|---|
| 2,306,606 | 12/1942 | Hirsch | 73—422 |
| 3,240,052 | 3/1966 | Rienecke | 73—23.1 |
| 3,255,575 | 6/1966 | Roberts | 55—46 |

OTHER REFERENCES

Gas Chromatography, 1958, edited by Desty Butterworth's Scientific Publications, London, 1958. Copy in art unit 285, pp. 293 and 294 relied upon.

S. CLEMENT SWISHER, *Primary Examiner.*

U.S. Cl. X.R.

55—210